(12) United States Patent
Newald et al.

(10) Patent No.: US 11,822,496 B2
(45) Date of Patent: Nov. 21, 2023

(54) METHOD FOR OPERATING A COMMUNICATIONS NETWORK, COMMUNICATIONS NETWORK, AND USERS FOR SAME

(71) Applicant: Robert Bosch GmbH, Stuttgart (DE)

(72) Inventors: Josef Newald, Stuttgart (DE); Lambros Dalakuras, Leonberg (DE); Thomas Hogenmueller, Hemmingen (DE)

(73) Assignee: ROBERT BOSCH GMBH, St (DE)

( * ) Notice: Subject to any disclaimer, the term of this patent is extended or adjusted under 35 U.S.C. 154(b) by 39 days.

(21) Appl. No.: 17/674,145

(22) Filed: Feb. 17, 2022

(65) Prior Publication Data
US 2022/0269631 A1 Aug. 25, 2022

(30) Foreign Application Priority Data
Feb. 24, 2021 (DE) ...................... 10 2021 104 423.5

(51) Int. Cl.
*G06F 13/38* (2006.01)
*G06F 13/40* (2006.01)

(52) U.S. Cl.
CPC .......... *G06F 13/385* (2013.01); *G06F 13/405* (2013.01); *G06F 13/4022* (2013.01)

(58) Field of Classification Search
None
See application file for complete search history.

(56) References Cited

U.S. PATENT DOCUMENTS

| 2015/0244806 A1* | 8/2015 | Renac ................... G06F 16/254 |
| | | 707/602 |
| 2020/0294401 A1* | 9/2020 | Kerecsen ............. G05D 1/0287 |
| 2021/0192314 A1* | 6/2021 | Aarts ..................... G06N 3/044 |
| 2022/0151022 A1* | 5/2022 | Chikkur Dattatraya .................... |
| | | H04W 80/12 |

* cited by examiner

*Primary Examiner* — Henry Tsai
*Assistant Examiner* — Aurangzeb Hassan
(74) *Attorney, Agent, or Firm* — NORTON ROSE FULBRIGHT US LLP; Gerard Messina (57) ABSTRACT

A method for operating a communications network that includes at least two users that are communicatively connected to one another via a descriptor-based communication system such as Ethernet. For writing data from a writing user into a user to be written, receive descriptors and data are transmitted from the writing user to the user to be written, in the user to be written, the data being written according to the received receive descriptors, and/or for reading data by a reading user from a user to be read, transmit descriptors are transmitted from the reading user to the user to be read, data being read by the user to be read according to the received transmit descriptors and transmitted to the reading user. A communications network and users are also described.

14 Claims, 4 Drawing Sheets

METHOD FOR OPERATING A COMMUNICATIONS NETWORK, COMMUNICATIONS NETWORK, AND USERS FOR SAME

FIELD

The present invention relates to a method for operating a communications network that includes at least two users, such a communications network, methods for operating individual users of a communications network, and such users.

BACKGROUND INFORMATION

In modern vehicles, there are various functions that are implemented by individual control units, and sensors and actuators connected thereto. Control units may in turn be connected to one another in a data-transmitting or communicative manner in order to exchange data or information. The entirety of control units, sensors, and actuators as well as possibly other components such as communication links in particular is also referred to as the vehicle electrical system or vehicle data network, and its design and configuration are also referred to as E/E architecture. Ethernet is a communication system that is also being increasingly used in vehicles.

SUMMARY

According to the present invention, a method for operating a communications network that includes at least two users, such a communications network, methods for operating individual users of a communications network, and such users, are proposed. Advantageous example embodiments of the present invention are disclosed herein.

The present invention relates to the communication between two users in a communications network that is based on Ethernet, for example, i.e., in which the two users (or also more than two users) are connected to one another via Ethernet or an Ethernet connection in a communicative (data-transmitting) manner. Although the present invention is explained below in particular using the example of Ethernet, other communication systems besides Ethernet may also be considered which are based on descriptors (in particular transmit descriptors and receive descriptors) or direct memory access (DMA) descriptors or which are controlled in this way to enable writing into arbitrary memory areas; these are in particular SPI, PCI Express, UART, LIN, and FlexRay.

One possible, and also preferred, use of the communication between two users via Ethernet, for example, is in a vehicle electrical system (or vehicle data network) in a vehicle, within the scope of which the present invention is also to be explained in greater detail below. Driven by cost optimization, increasing complexity of the electronics in the vehicle, and new options due to technical progress, efforts are being made, in particular by vehicle manufacturers, to optimize the E/E architecture. In order on the one hand to save costs by simplifying the wiring harness, and on the other hand to increase the flexibility and scalability by concentrating or centralizing software on so-called vehicle central computers, the use of a so-called zonal E/E architecture or zone architecture comes into consideration. In zonal E/E architecture, for example sensors, actuators, "intelligent" mechatronics or mechatronic units (so-called smart components, which are understood herein to mean mechanical units having their own computational logic system or controller, for example a radiator mechatronic system made up of a fan motor, fan output stage, and fan microcontroller, or for example the mechatronics of a transmission that controls shifting operations) and (smart) electronic control units (ECUs), i.e., control units in the conventional sense are connected, corresponding to their geometric position in the vehicle, to one or more vehicle central computers via so-called zone control units. The zone control units function in particular as energy and data distributors, the actual logic or function being executed or computed, at least to the extent possible, on the vehicle central computer.

The centralization of the software (with logic and function) is typically accompanied by the use of fairly powerful processing units on the vehicle central computer; the current, commonly used microcontroller (µC)-based systems are expanded in this device class with microprocessors (µP). The operating systems (POSIX-based operating systems, for example) running thereon enable a so-called service-oriented architecture (SOA) that allows efficient and rapid development of functions.

With the introduction of this zone architecture, the star-shaped cable network used thus far may be broken up and significantly simplified. As a result, much shorter lines are made possible overall, which reduces the complexity in the main wiring harness of the vehicle. Due to shifting the high-level software (having various functionalities, for example for the driver) into the vehicle central computer, the computation effort is concentrated in the vehicle central computer.

As mentioned, the vehicle electrical system or the E/E architecture of a vehicle, in which the present invention may also be used, is based in particular on an architecture such as zone architecture. This zone architecture has three layers: a computational layer, a zonal layer, and an execution or embedded layer. The vehicle central computer is provided in the computational layer. It is also possible to use multiple such vehicle central computers, which are then correspondingly associated with all of the computational layers. Preferably, the vehicle central computer is connected (in particular wirelessly) to a vehicle-external or vehicle-remote processing unit such as a remote computer system or a server ("cloud"), via which various functions or services or also software updates may be provided. With multiple vehicle central computers, connecting one of them to the vehicle-remote processing unit may be sufficient. This vehicle-remote processing unit may then likewise be associated with the computational layer.

Zone control units (in the generic sense) are provided in the zonal layer, typically multiple zone control units being present even if the zone architecture is basically usable for only one zone control unit. Execution units (in the generic sense) are provided in the execution layer, typically multiple execution units being present for each zone control unit, even if the zone architecture is basically usable for only one execution unit overall, or one execution unit for each zone control unit.

The zone control units, which may be relatively simple computer systems or processing units as explained in greater detail below, are used in particular for the geometric or spatial distribution in the vehicle. For example, four zone control units may be provided, one each for the front, rear, left, and right sides of the vehicle (in this regard, also see the figures together with the description of the figures). Execution units are understood in particular to mean sensors, actuators, "intelligent" mechatronics or mechatronic units (so-called smart components, which are understood herein to mean mechanical units having their own computational logic system or controller, for example a radiator mechatronic system made up of a fan motor, fan output stage, and fan microcontroller, or for example the mechatronics of a transmission that controls shifting operations)) and (smart) electronic control units (ECUs), i.e., conventional control units, and other mechatronic units that are situated on the lowest layer and responsible for (directly) carrying out actions or measurements. Due to the association of the execution units with one zone control unit in each case, the individual execution units may also be correspondingly associated with one zone such as "front" or "rear." For example, all control units situated in the engine compartment may be associated with the "front" zone.

The zone control units are in each case communicatively connected to the vehicle central computer (or the computational layer) with the aid of a first communication system. In particular, Ethernet or an Ethernet based communication system comes into consideration here as the first communication system. In the case of multiple vehicle central computers, each zone control unit may be connected to (only) one of these vehicle central computers. Each execution unit is communicatively connected, directly or indirectly, to the zone control unit associated with it via a second communication system, such as a communication bus. For example, a CAN bus or LIN bus comes into consideration here as the second communication system or communication bus, although simple signal lines are also possible. Various execution units may be connected to the same zone control unit, or also possibly via various communication buses. Individual execution units may be directly connected to the associated zone control unit, this applying in particular for control units or smart or intelligent sensors and actuators.

However, an execution unit may likewise be indirectly connected to the zone control unit, in that case via such a control unit, for example. This applies in particular for simple sensors and actuators. For all communication systems, a communicative connection is understood in particular to mean that data or information may be exchanged, in particular digitally (but also possibly in an analog manner for simple sensors), but also, for example, simple voltage values and/or current values (obtained, for example, by changing the resistance of a temperature sensor).

As mentioned, the present invention concentrates on the communication via descriptor-based communication systems such as Ethernet. This communication conventionally takes place by reading/writing data from/into the memory of microcontrollers or microprocessors. The memory location and the number of memory cells are configured or specified via so-called descriptors. These descriptors have memory areas (also referred to as buffers), typically in the working memory (RAM), in which the data to be sent are present (in which case transmit descriptors are involved) or into which the received data are written (in which case receive descriptors are involved). The descriptors are read and processed by a network controller (generally an integrated circuit (IC) (chip)), for example an Ethernet controller.

A local CPU (processor) on which software (Ethernet stack, TCP/IP driver, etc.) is executed is typically present on each of the communications users. This software writes (or configures) the corresponding transmit descriptors or receive descriptors as well as the memory areas (transmit buffers) of the transmission data or of the data to be sent by a user (to the other user).

For the receipt of data, the software reads the reception status from the receive descriptors and processes the data from the memory areas for the reception data (receive buffers).

The power of the CPU or of the software executed in the CPU essentially determines the number of pieces of data or messages (with Ethernet, also referred to as packets, for example) that can be processed in a certain period of time. With Gigabit Ethernet, a short message may be less than 1 µs long, for example, which is in the range of an interrupt latency or the processing time of a message. This may result in bottlenecks in the data exchange in systems with strict real-time requirements, for example in vehicles. In particular for the above-mentioned zone architecture having a powerful vehicle central computer and relatively simple or less powerful zone control units (which, as mentioned, both users of an Ethernet-based communications network may indeed be), to which sensors or actuators, for example, are then connected, this may result in problems.

Against this background, an option is now provided with which, in a communication system in which two users are communicatively connected to one another via a descriptor-based communication system such as Ethernet, one of the users (also referred to below as the writing or reading user) may directly write arbitrary data areas into the other user (also referred to below as the user to be written or to be read) and/or may read arbitrary data areas from the other user. For this purpose, the writing or reading user now transfers the corresponding descriptors to the user to be written or to be read or to its controller or Ethernet controller or Ethernet communication controller, i.e., a communication interface for Ethernet or the respective communication system. It is important in particular for the communication to be sent or received via (DMA or send and receive) descriptors, but independently of the bus system or communication system.

The controller may directly access the buffers of the user with the aid of so-called direct memory access (DMA). The CPU or software of the user to be written or to be read does not have to be involved for this purpose.

Within the meaning of the zone architecture in a vehicle explained above, for example the vehicle central computer, as a server (writing or reading user), may access a zone control unit as a client (user to be written or to be read), and from there may, for example, read out sensor data or transmit data there in order to activate an actuator.

It is noted that both users may also be appropriately configured to receive their descriptors via Ethernet and from their own CPU. This allows a fully automated communication; i.e., both users then run strictly in hardware according to their configuration, without involving the CPU or software of the user. For example, an external computer system may be used for the configuration.

For this purpose, for writing (useful) data by the writing user into the user to be written (for example, for transferring data from the server to the client), receive descriptors and the (useful) data (that are to be written) are transmitted from the writing user to the user to be written (via the Ethernet connection), in the user to be written the (useful) data being written according to the received receive descriptors.

For example, a chain of descriptors may be used. As mentioned, memory areas for data to be received are assigned by the receive descriptors: For example, further receive descriptors are continuously written by the user or server that is to write. Earlier, and thus "used up," descriptors are continually replaced with new descriptors; i.e., a type of ring of descriptors or spaces for descriptors may be formed. In particular, (receive) descriptors may also always be used for subsequent data to be received, for example in the next data packet, so that they are already present upon receipt of the data in question in the user that is to write.

Data that are transmitted in this way from one user to the other, for example from the server to the client, may also include configurations, for example, for microprocessors or pulse width modulators (PWMs) and also other general-purpose ports (GPIOs) or other outputs with, for example, actuators and the like. The user to be written is thus configured in particular by the writing user, and data are written and for example ports are set. In particular, outputs of a microprocessor may thus be set and adjusted or activated as desired.

For reading (useful) data by a reading user from a user to be read (and thus, for example, for transferring data from the client to the server), transmit descriptors are transmitted from the reading user to the user to be read. This user (i.e., the user to be read) then reads the (useful) data according to the received transmit descriptors (from the memory or buffer of the user to be read) and transmits them to the reading user (via the Ethernet connection). For this purpose, the memory access management of the (Ethernet communication) controller of the user to be written or to be read (the client, for example) copies the appropriate memory areas, i.e., the (useful) data to be sent to the other user (server), from the memory of the user to be written or to be read into a transmission packet.

Thus, for example, the server may prompt the client to send arbitrary data from its memory by appropriately writing or configuring the transmit descriptors. The server (or the reading user) thus transfers the transmit descriptors and therefore, for example, also the configuration concerning from which memory address, with what data length, the client (or the user to be read) is to send data. Data that are detected via inputs of the client, for example measured data of connected sensors, may thus also be read. In particular, inputs of a microprocessor may be read out in this way. In addition, for example the transmission protocol, i.e., the header information of the transmission frames (for example, "UDP via TCP/IPv4 and VLAN17 with priority 3") may be established as desired.

The proposed procedure is comparable to a so-called bootstrap principle (also "von Münchhausen principle"), since the sending operation is initiated by the transmit descriptors and thus used for the reading.

Thus, after a one-time configuration in the user to be written or to be read (client), no software is required in order to write data into a client and read data from the client. In the one-time or initial configuration, it is necessary only to establish the sequences of how the receive descriptors and transmit descriptors are to be written or to be processed. In contrast, the content of the descriptors is communicated by the server (writing or reading user).

A bandwidth for the descriptors to be transmitted (this applies in particular for the transmit descriptors as well as the receive descriptors) is preferably limited to a predefined value of, for example, 10% or 15% of the total bandwidth of the communications network. In other words, the data volume occupied by the descriptors within a packet or frame or within all packets in the Ethernet communication must not be more than this value. This prevents the communications network from becoming overloaded. The bandwidth for these descriptors may be limited, for example, via the corresponding priority together with a "credit-based shaper" (CBS), a method for processing queues in the data communication. A simultaneous use of the present invention with time-sensitive networking (TSN) methods, for example, may thus be possible.

In addition, a timer value and/or a counter value are/is preferably transmitted by each user, in particular with or in each sent packet or frame. This allows monitoring of functional security. The counter values may be checked, for example, by an independent entity (the CPU, for example). In this way it may be recognized whether, or that in fact, new data have been received or detected, and that the same information has not been erroneously transferred over and over. A difference between two successive counter values or timer values should lie within a predefined tolerance range, for example.

To achieve cybersecurity (protection from undesirable digital attacks), Secure Onboard Communication (SecOC) via hardware security modules (HSMs) may be used; this interface is also usable via the proposed automation.

Apart from a method for operating such a communication network, the present invention also relates to such a communications network and users for same, in particular a writing and reading user and a user to be written and to be read. As described in the above discussion, a certain user may in particular at the same time be a writing and reading user as well as a user to be written and to be read.

For further embodiments and advantages of the communication system and users, to avoid repetitions reference is made to the above statements, which correspondingly apply here. In particular, for example the steps to be carried out in each case by the respective (i.e., writing, reading, to be written, or to be read) user apply for the users.

Further advantages and embodiments of the present invention result from the description and the figures.

The present invention is schematically illustrated in the figures based on one exemplary embodiment, and is described below with reference to the figures.

DETAILED DESCRIPTION OF EXAMPLE EMBODIMENTS

Figure 1:
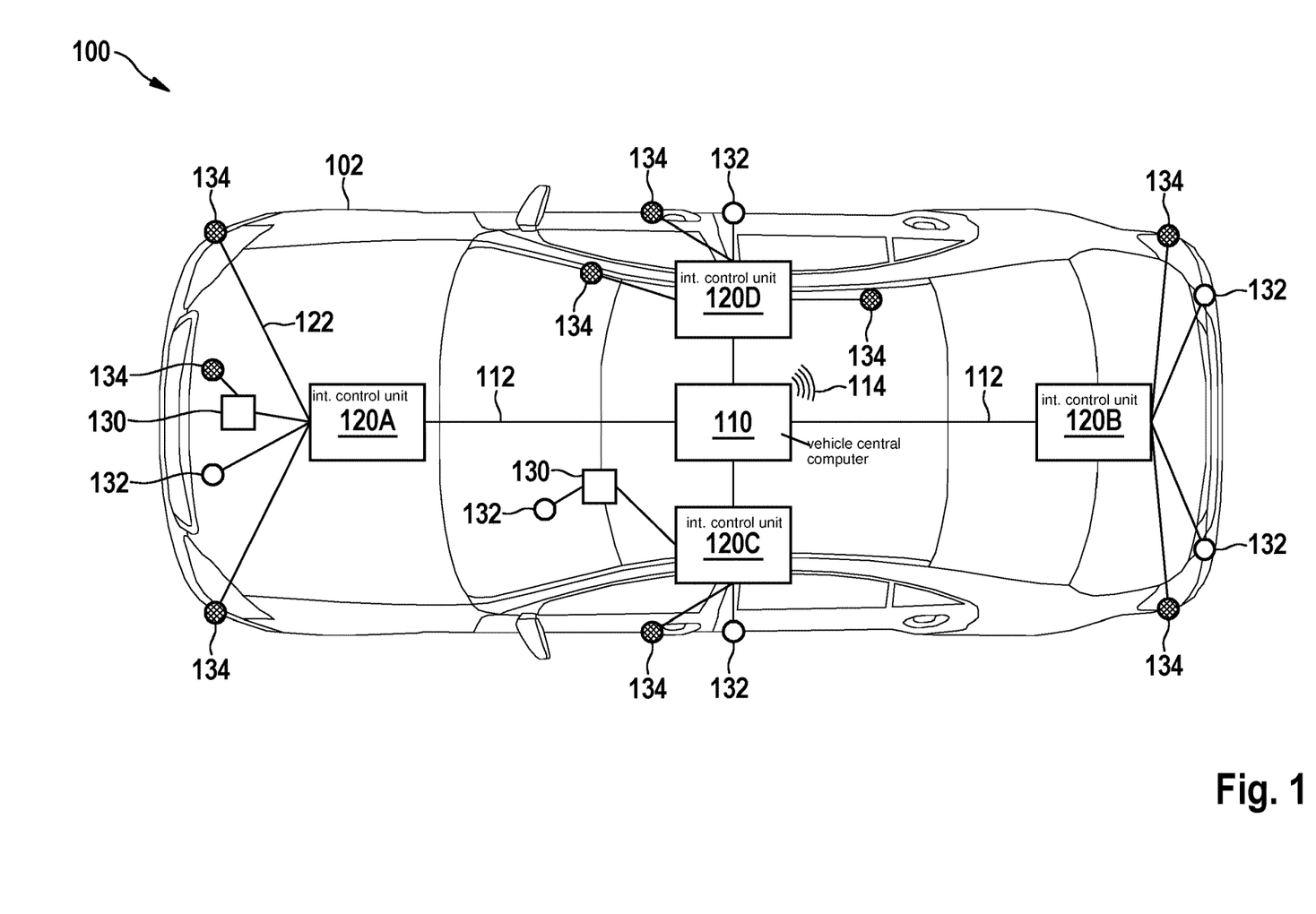
FIG. 1 schematically shows a vehicle electrical system in a vehicle in which the present invention may be used.

FIG. 1 schematically illustrates a vehicle electrical system 100 in a vehicle 102 for explaining the present invention, on the basis of which the E/E architecture and the distribution of the individual units or components of the vehicle electrical system are to be explained. Vehicle electrical system 100 includes by way of example a vehicle central computer 110, four intermediate control units 120A, 120B, 120C, 120D that are designed (or used) as zone control units, and multiple execution units, which in the present case include control units 120, intelligent mechatronic units 132, and actuators and sensors 134 (a distinction is not made here between actuators and sensors).

Zone control units 120A, 120B, 120C, 120D are respectively associated with a "front," "rear," "left," and "right" zone by way of example, and in each case are communicatively connected to vehicle central computer 110 via a first communication system 112, for example Ethernet, which allows a communication of each of the zone control units with vehicle central computer 110. In addition, vehicle central computer 110 includes a wireless communication link 114 (or a corresponding communication module) to allow communication with a vehicle-remote processing unit ("cloud"), for example, as explained in greater detail below.

Execution units 130, 132, 134 are each associated with one of the zone control units, and are communicatively connected, indirectly or directly, to the respective zone control unit via a second communication link 122 such as a CAN bus or LIN bus. For example, control unit 130 associated with zone control unit 120A is directly connected to the zone control unit, whereas one of sensors/actuators 134 is indirectly connected, namely, via control unit 130; this sensor/actuator 134 is in particular directly connected to control unit 130. Other sensors/actuators 134 are, for example, also directly connected to the zone control unit, and the same applies for intelligent mechatronic units 132.

Second communication systems 112 for connecting the execution units to the zone control units or optionally to one another do not necessarily all have to be identical; a difference is possible, depending on the type of execution unit. Thus, simpler sensors are connected only via LIN, for example, and slightly more complex control units are connected via CAN, for example. However, the zone control units have corresponding interfaces.

The specific type or functionality of execution units 130, 132, 134 is not important for the present invention; for example, execution units 130, 132, 134, which are associated with zone control unit 120A and thus with the "front" zone, include, for example, lights or actuators for windshield wipers or the like. The same applies for zone control unit 120B or the "rear" zone. The execution units associated with zone control units 120C, 120D or the respective "left" and "right" zones may be, for example, buttons and actuators for window lifts. At this point it is noted once more that this vehicle electrical system is strictly an example intended for explanation of the present invention.

However, it is clear from the vehicle electrical system 100 shown that the zone control units make possible a targeted association or division of the individual execution units according to geometric zones if there is only one vehicle central computer (or possibly a few vehicle central computers), as the result of which the entire (cumulative) length of cables for the vehicle electrical system may sometimes be reduced significantly compared to conventional E/E architecture.

At this point it is noted that this pertains in particular to the communication systems or communication media. It is understood that an energy or power supply, not further discussed here, is also necessary for the individual units.

Figure 2:
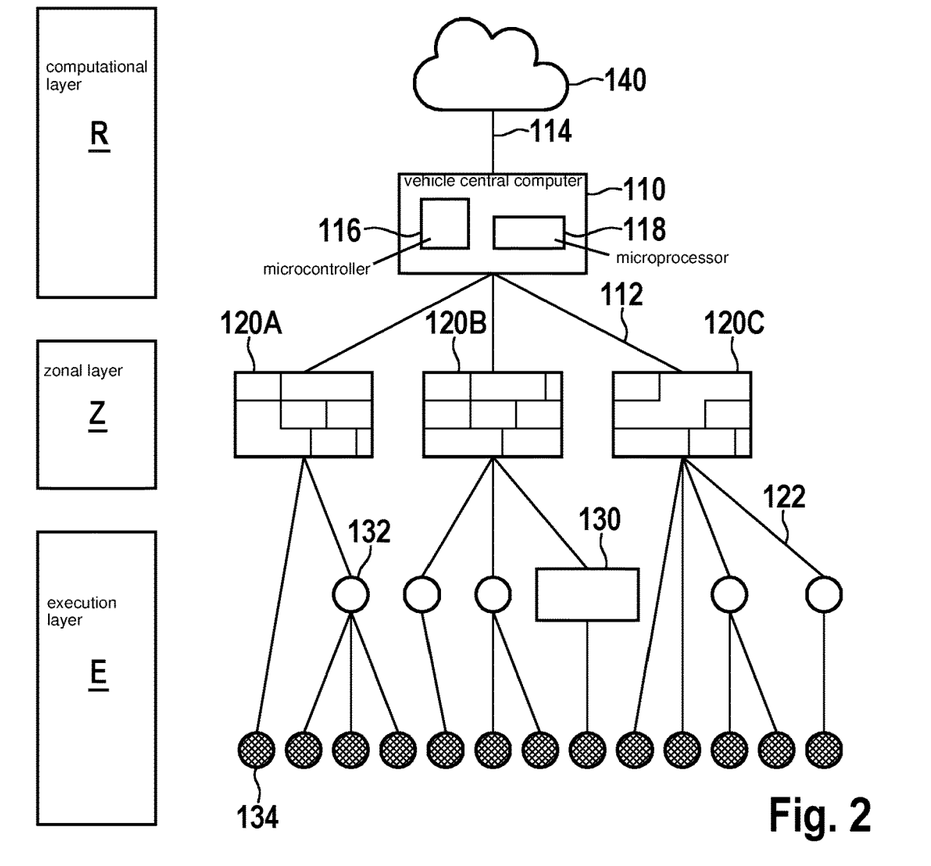
FIG. 2 schematically shows a zone architecture of a vehicle electrical system for explaining the present invention.

FIG. 2 schematically illustrates a zone architecture of a vehicle electrical system for further explaining the present invention or its background. The vehicle electrical system shown here is comparable to vehicle electrical system 100 from FIG. 1, but with a slightly changed number of individual units; however, the designations correspond to those from FIG. 1. Thus, for example, only the three zone control units 120A, 120B, 120C with which execution units are associated in each case, and whose number possibly differs from that from FIG. 1, are shown. However, this has no effect on the functional principle of the present invention.

As mentioned above, such a zone architecture has three layers with which the individual units are associated. Vehicle central computer 110, shown here with a microcontroller 116 and a microprocessor 118 by way of example, is associated with computational layer R. Likewise shown is a vehicle-remote processing unit 140 (which is, for example, a central server or high-performance computer that is situated remotely from the vehicle and that provides memory and computing power), to which the vehicle central computer is connected via wireless communication link 114. Vehicle-remote processing unit 140 is likewise associated with computational layer R.

Zone control units 120A, 120B, 120C are associated with zonal layer Z, and execution units 130, 132, 134 are associated with execution or embedded layer E. Within execution layer E, control units 130 and intelligent mechatronic units 132 are situated in an intermediate stage above sensors/actuators 134, which, however, has no effect on the functional principle of the present invention.

The communication systems and the communicative connection, explained above with reference to FIG. 1, result in the communication concept that a communication between an execution unit (in execution layer E) and the vehicle central computer (in computational layer R) always or only takes place via a zone control unit (in zonal layer Z). In turn, a communication between two zone control units always or only takes place via computational layer R. The zone control units themselves are thus used only as a type of gateway or tunnel, for example. Each zone control unit re-outputs incoming data with the content unchanged, or at best a formal adaptation to the other communication system, for example from LIN to Ethernet or from Ethernet to CAN, or encapsulation is carried out.

Within the scope of the present invention, in particular those units that are communicatively connected to one another via a descriptor-based communication system, in particular Ethernet, are now of interest. These are in particular vehicle central computer 110 and zone control units 120A, 120B, 120C. As mentioned above, a communication generally takes place between the vehicle central computer and each of the zone control units. Within the meaning of the present invention, this involves users of a communications network that are communicatively connected to one another via Ethernet. However, units that communicate via LIN or FlexRay, for example, also come into consideration.

Basically, within the scope of the present invention, as mentioned, each user may be a writing and reading user as well as a user to be written and to be read. Due to the special design of the zone architecture, however, the vehicle central computer will in particular be a writing and reading user (then also referred to as a server), whereas a zone control unit will be a user to be written and to be read (then also referred to as a client).

Figure 3:
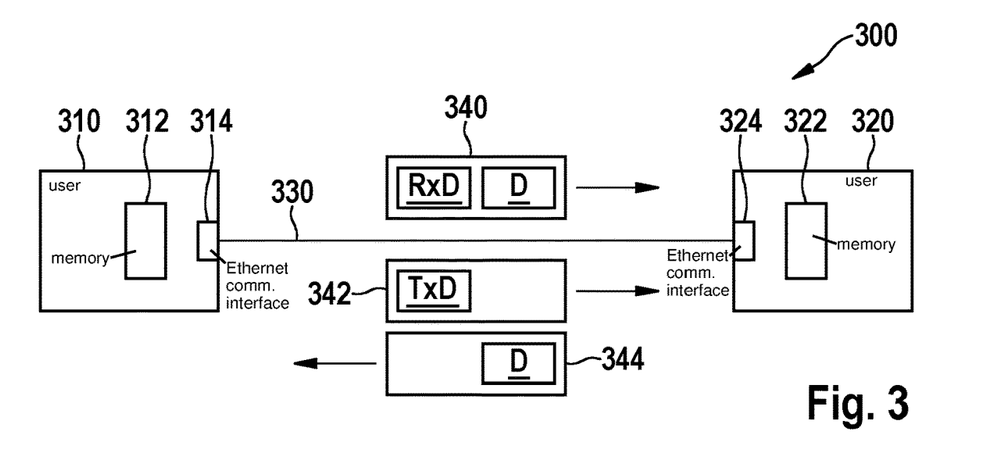
FIG. 3 schematically shows a communications network according to the present invention in one preferred specific embodiment.

FIG. 3 schematically illustrates a communications network 300 according to the present invention in one preferred specific embodiment. As an example, communications network 300 includes two users 310, 320 that are communicatively connected to one another via a descriptor-based communication system 330 designed as Ethernet or an Ethernet connection. As an example, user 310 is to be used as a writing and reading user (this may be, for example, the vehicle central computer according to FIG. 1 or 2), and user 320 is to be used as a user to be written and to be read (this may be, for example, a zone control unit according to FIG. 1 or 2). The two users 310, 320 respectively include an Ethernet communication interface 314, 324 and a memory (buffer) 312, 322 by way of example.

For writing (useful) data D, user 310 transmits data D as well as receive descriptors, denoted here by reference symbol RxD by way of example, in a message or a packet 340 to user 320. These receive descriptors are written or created by user 310, although it is also possible for them to be preconfigured. User 320 receives message 340 and writes data D, according to receive descriptors RxD or the descriptor data contained therein, into its buffer (or the location defined by the receive descriptor). As mentioned above, receive descriptors for a subsequent message or data contained therein may always be transmitted as well. In particular, the Ethernet controller in user 320 thus does not obtain its receive descriptors from a CPU or software of user 320, but, rather, takes them from an Ethernet packet, in particular the same packet that also contains the useful load or useful data, or also from a previous packet. In particular, the Ethernet controller in user 320 writes the data, without software or CPU assistance, with the aid of direct memory access to the location defined by the receive descriptor.

For reading (useful) data, user 310 transmits transmit descriptors, denoted here by reference symbol TxD by way of example, in a message or a packet 342 to user 320. These transmit descriptors are written or created by user 310, although it is also possible for them to be preconfigured. User 320 receives message 342 and then reads data D from its memory according to transmit descriptors TxD or the descriptor data contained therein, and transmits them in a message 344 to user 310, which then receives them. In particular, the Ethernet controller in user 320 thus does not obtain its transmit descriptors from a CPU or software of user 320, but, rather, takes them from an Ethernet packet. In particular, the Ethernet controller in user 320 reads the data, without software or CPU assistance, with the aid of direct memory access from the location defined by the transmit descriptor.

Figure 4:
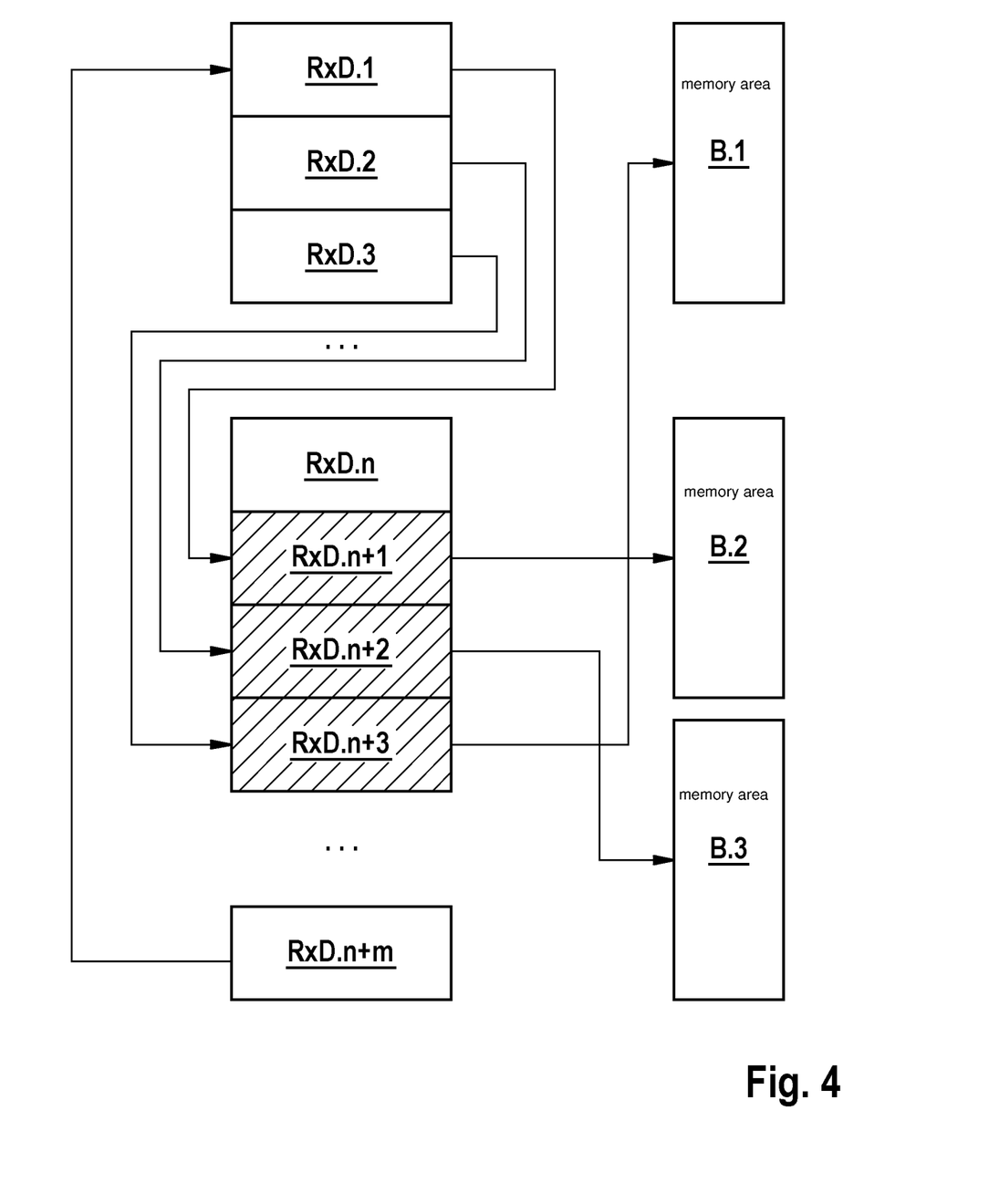
FIG. 4 schematically shows a sequence of a method according to the present invention in one preferred specific embodiment.

FIG. 4 schematically illustrates a sequence of a method according to the present invention in one preferred specific embodiment, in particular with the aspect of writing data. For this purpose, first shown are receive descriptors RxD.1 through RxD.n and RxD.n+1 through Rx.D.n+m, which the writing user writes. In particular, receive descriptors RxD.n+1 through Rx.D.n+m (hatched), as explained with reference to FIG. 3, are to be transmitted to the user to be written. As mentioned, receive descriptors as well as transmit descriptors are "used up" after the one-time use, since a reception status or transmission status is generally entered there. Therefore, future descriptors (illustrated by arrows) must also always be transmitted as well. This is easily possible due to the fact that multiple descriptors may be received or sent simultaneously via one block. Overall, a ring with descriptors that are to be continually overwritten is formed. Memory areas (buffers), denoted by reference symbols B.1 through B.3 by way of example and into which the (useful) data, received together with the receive descriptors, are to be written, are present in the user to be written.

In the receive descriptors it is established which data are to be written into which memory areas (in particular, with the exact memory address and data volume, for example). For example, memory area B.1 may contain the data for a PWM signal that is to be applied to an actuator, for example, memory area B.2 may contain other data, and memory area B.3 may contain, for example, data for configuring a certain port or output (a signal output, for example) at the user to be written. These data are then advantageously written, by an Ethernet controller of the user that is to write, to the addresses defined in the receive descriptors, in particular with the aid of direct memory access.

In this way, the writing user may write data in the user to be written, and, for example, may also thus configure actuators connected to the user to be written (which in the present case is after all e.g. a control unit) or configure the activation thereof. It is understood that for sending the data, transmit descriptors are also necessary on the writing user side, which, however, may take place in the customary manner.

Figure 5:
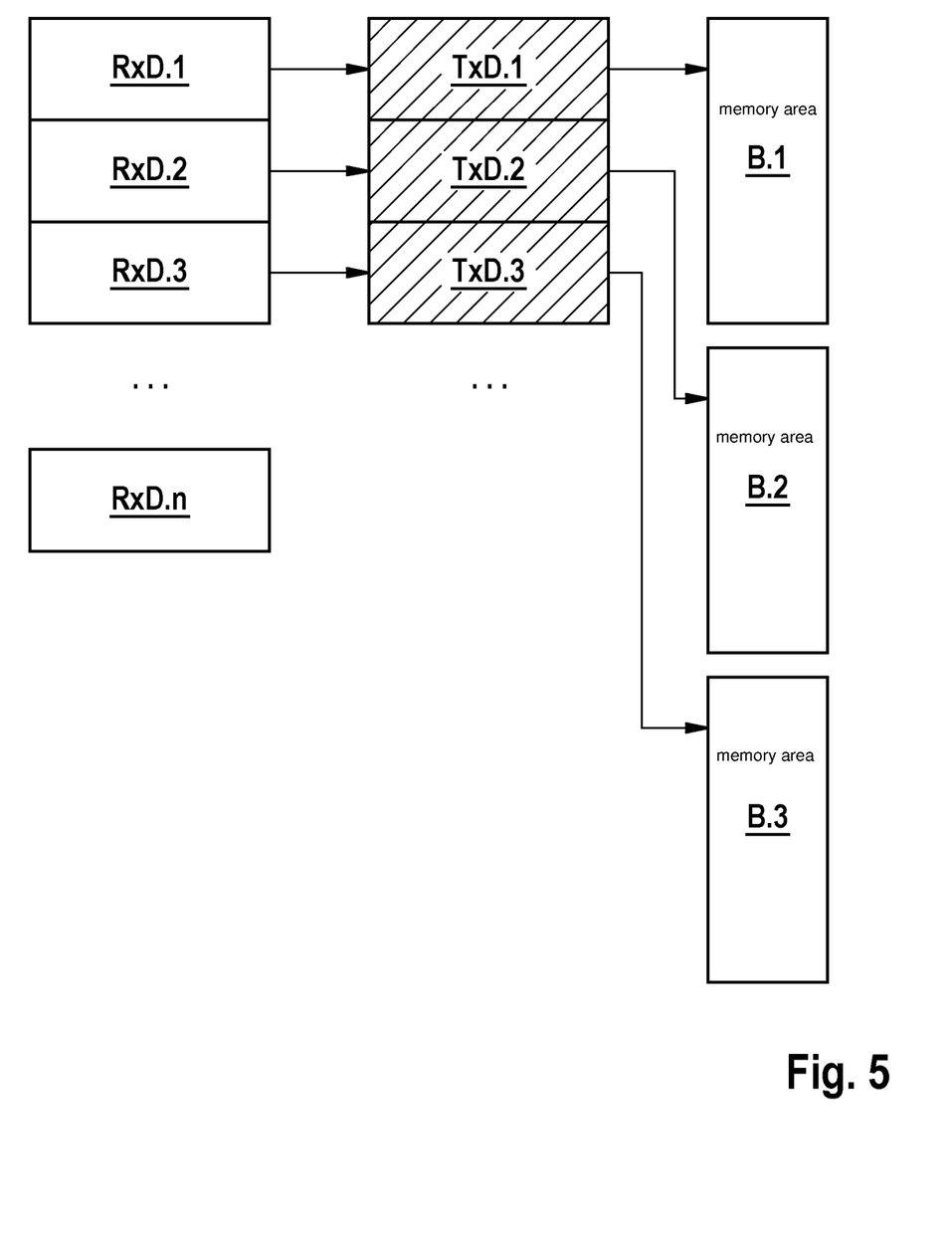
FIG. 5 schematically shows a sequence of a method according to the present invention in a further preferred specific embodiment.

FIG. 5 schematically illustrates a sequence of a method according to the present invention in a further preferred specific embodiment, in particular with the aspect of reading data. For this purpose, first shown are receive descriptors RxD.1 through RxD.n of the reading user, according to which the data to be read, after they have been received, are to be written or stored in the reading user. These receive descriptors RxD.1 through RxD.n are in particular created by software in the reading user.

Also shown are transmit descriptors TxD.n.1 through Tx.D.3 (hatched) which, as explained with reference to FIG. 3, are transmitted to the user to be read. These transmit descriptors TxD.n.1 through Tx.D.3 are also created in particular by software in the reading user.

The user to be read contains memory areas (buffers), denoted by reference symbols B.1 through B.3 by way of example, from which data are to be read according to the transmit descriptors and then transmitted to the reading user. In the transmit descriptors it is established which data are to be read and sent from which memory areas of the user to be read (in particular, with the exact memory address and data volume, for example). For example, memory area B.1 may contain the data from an ADC signal that has been obtained from a sensor, for example, memory area B.2 may contain, for example, data (or measured data) from some other input, and memory area B.3 may contain, for example, data that have been obtained from a CAN receiver. These data are then read, by an Ethernet controller of the user to be read, from the addresses defined in the transmit descriptors, in particular with the aid of direct memory access, and sent in corresponding Ethernet packets.

The transmit descriptors are advantageously written or configured in such a way that the data to be transmitted by the user to be read may be correspondingly received and stored in the reading user according to the receive descriptors.

In this way, the reading user may read data from the user to be read.

What is claimed is:

1. A method for operating a communications network that includes at least two users that are communicatively connected to one another via a descriptor-based communication system, the method comprising the following:

for writing data from a writing user into a user to be written: (i) transmitting, via the descriptor-based communication system, receive descriptors and data from the writing user to the user to be written, and (ii) in the user to be written, writing, by the user to be written, the data transmitted from the writing user into memory areas of the user to be written, the memory areas of the user to be written being defined by the receive descriptors transmitted by the writing user, wherein the writing user and the user to be written are communicatively connected to one another via the descriptor-based communication system; and/or for reading data by a reading user from a user to be read: (i) transmitting, via the descriptor-based communication system, transmit descriptors from the reading user to the user to be read, and (ii) in the user to be read, reading data by the user to be read from memory areas of the user to be read, the memory areas of the user to be read being defined by the transmit descriptors transmitted from the reading user, and transmitting, by the user to be read via the descriptor-based communication system, the read data to the reading user, wherein the reading user and the user to be read are communicatively connected to one another via the descriptor-based communication system;

wherein the descriptor-based communication system is Ethernet, or SPI, or PCI Express, or UART, or LIN, or FlexRay.

2. The method as recited in claim 1, wherein the data transmitted from the writing user to the user to be written are used to configure outputs of the user to be written.

3. The method as recited in claim 2, wherein one or multiple actuators are connected to the outputs of the user to be written, activation of the actuators being configured using the data transmitted from the writing user.

4. The method as recited in claim 1, wherein the read data from the user to be read, transmitted from the user to be read to the reading user, include data that are detected at inputs of the user to be read.

5. The method as recited in claim 4, wherein one or multiple sensors whose measured data include the detected data are connected to the inputs of the user to be read.

6. The method as recited in claim 1, wherein a transmission protocol for the user to be read for the transmitting of the read data to the reading user is predefined using the transmit descriptors that are transmitted from the reading user to the user to be read.

7. The method as recited in claim 1, wherein a bandwidth for the receive and transmit descriptors to be transmitted is limited to a predefined value.

8. The method as recited in claim 1, wherein a timer value and/or a counter value is transmitted by each user.

9. The method as recited in claim 1, wherein a vehicle central computer is used in a vehicle as the writing and/or reading user, and an intermediate control unit with connected execution units, is used in the vehicle as the user to be written and/or to be read.

10. A method for operating a user as a writing and/or reading user in a communications network that includes at least two users that are communicatively connected to one another via a descriptor-based communication system, the method comprising:

for writing data from the user into another user, transmitting, via the descriptor-based based communication system, receive descriptors and data from the user to the other user, so that the data transmitted from the user may be written by the other user into memory areas of the other user, the memory areas of the other user to be written into being defined by the receive descriptors transmitted by the user, wherein the user and other user are communicatively connected to one another via the descriptor-based communication system, and/or for reading data by the user from the other user, transmitting, via the descriptor-based based communication system, transmit descriptors from the user to the other user, so that data may be read from memory areas of the other user by the other user, the memory areas of the user to be read from being defined by the transmit descriptors transmitted by the user, and the data read from the memory areas being transmitted to the user by the other user, and the data transmitted by the other user being received by the user;

wherein the descriptor-based communication system is Ethernet, or SPI, or PCI Express, or UART, or LIN, or FlexRay.

11. A method for operating a user as a user to be written and/or to be read in a communications network that includes at least two users that are communicatively connected to one another via a descriptor-based communication system, the method comprising:

for writing data, receiving receive descriptors and data by the user from another user via the descriptor-based communication system, and writing by the user the data received from the other user to memory areas of the user, the memory areas of the user being defined by the receive descriptors received by the user from the other user, wherein the user and other user are communicatively connected to one another via the descriptor-based communication system, and/or for reading data, receiving transmit descriptors by the user from the other user via the descriptor-based communication system, and reading data by the user from memory areas of the user to, the memory areas of the user being defined by the transmit descriptors received by the user from the other user, and transmitting via the descriptor-based communication system by the user the data read from the memory areas to the other user;

wherein the descriptor-based communication system is Ethernet, or SPI, or PCI Express, or UART, or LIN, or FlexRay.

12. A communications network that includes at least two users that are communicatively connected to one another via a descriptor-based communication system, the communications network being configured so that:

for writing data from a writing user into a user to be written: (i) the writing user transmits, via the descriptor-based communication system, receive descriptors and data to the user to be written, and (ii) the user to be written writes the data transmitted from the writing user into memory areas of the user to be written, the memory areas of the user to be written being defined by the receive descriptors transmitted by the writing user, wherein the writing user and the user to be written are communicatively connected to one another via the descriptor-based communication system, and for reading data by a reading user from a user to be read (i) transmit descriptors are transmitted from the reading user to the user to be read via the descriptor-based based communication system, and Iii) the user to be read reads data from memory areas of the user to be read, the memory areas of the user to be read being defined by the transmit descriptors transmitted from the reading user, and the user to be read transmits the read data to the reading user via the descriptor-based communication system, wherein the writing user and the user to be written are communicatively connected to one another via the descriptor-based communication system;

wherein the descriptor-based communication system is Ethernet, or SPI, or PCI Express, or UART, or LIN, or FlexRay.

13. A user for use as a writing and/or reading user in a communications network that includes at least two users that are communicatively connected to one another via a descriptor-based communication system, wherein:

for writing data in another user, the user is configured to transmit receive descriptors and data to the other user via the descriptor-based communication system, so that the data transmitted by the user are written by the other user into memory areas of the other user, the memory areas of the other user being defined by the receive descriptors transmitted by the user, the user and the other user being communicatively connected to each other via the descriptor-based communication system, and/or for reading data from the other user, the user is configured to transmit transmit descriptors to the other user via the descriptor-based communication system, so that data are read by the other user from memory areas of the other user, the memory areas being defined by the transmit descriptors transmitted by the user, and the read data are transmitted by the other user to the user via the descriptor-based communication system, the user being configured to receive the read data transmitted from the other user;

wherein the descriptor-based communication system is Ethernet, or SPI, or PCI Express, or UART, or LIN, or FlexRay.

14. A user for use as a user to be written and/or to be read in a communications network that includes at least two users that are communicatively connected to one another via a descriptor-based communication system, wherein:

for writing data, the user is configured to receive descriptors and data from another user via the descriptor-based communication system, and to write the data received from the other user in memory areas of the user, the memory areas of the user being defined by the receive descriptors received from the other user, wherein the user and other user are communicatively connected to one another via the descriptor-based communication system, and/or for reading data, the user is configured to receive transmit descriptors from the other user via the descriptor-based communication system, and the user is configured to read data from memory areas of the user, the memory areas being defined by the transmit descriptors received from the other user, and the user being configured to transmit the read data to the other user;

wherein the descriptor-based communication system is Ethernet, or SPI, or PCI Express, or UART, or LIN, or FlexRay.

\* \* \* \* \*